(12) United States Patent
Dyatkin et al.

(10) Patent No.: US 11,827,572 B2
(45) Date of Patent: Nov. 28, 2023

(54) NANO-CRYSTALLINE REFRACTORY METAL CARBIDES, BORIDES OR NITRIDES WITH HOMOGENEOUSLY DISPERSED INCLUSIONS

(71) Applicant: The Government of the United States of America, as represented by the Secretary of the Navy, Arlington, VA (US)

(72) Inventors: Boris Dyatkin, Washington, DC (US); Matthew Laskoski, Springfield, VA (US); William Edelen, White Plains, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 1189 days.

(21) Appl. No.: 16/255,746

(22) Filed: Jan. 23, 2019

(65) Prior Publication Data
US 2019/0225548 A1    Jul. 25, 2019

Related U.S. Application Data

(60) Provisional application No. 62/620,595, filed on Jan. 23, 2018.

(51) Int. Cl.
*C04B 35/589* (2006.01)
*C04B 35/563* (2006.01)
(Continued)

(52) U.S. Cl.
CPC ............ *C04B 35/589* (2013.01); *B32B 18/00* (2013.01); *C04B 35/563* (2013.01); *C04B 35/565* (2013.01); *C04B 35/5607* (2013.01); *C04B 35/5622* (2013.01); *C04B 35/573* (2013.01); *C04B 35/65* (2013.01); *B32B 2264/107* (2013.01); *C04B 2235/3217* (2013.01); *C04B 2235/3804* (2013.01); *C04B 2235/386* (2013.01); *C04B 2235/3817* (2013.01); *C04B 2235/3821* (2013.01); *C04B 2235/3826* (2013.01); *C04B 2235/3839* (2013.01); *C04B 2235/3873* (2013.01);
(Continued)

(58) Field of Classification Search
CPC ............ C04B 35/83; C04B 2235/3817; C04B 41/5058; C01B 32/921; C01B 32/991; C01B 32/323
See application file for complete search history.

(56) References Cited

U.S. PATENT DOCUMENTS

| | | |
|---|---|---|
| 8,778,488 B2 | 7/2014 | Keller et al. |
| 8,815,381 B2 * | 8/2014 | Keller .................. C04B 35/524 501/87 |

(Continued)

*Primary Examiner* — Noah S Wiese
(74) *Attorney, Agent, or Firm* — US Naval Research Laboratory; Joseph T. Grunkemeyer

(57) ABSTRACT

Disclosed are compositions containing nanoparticles of a metal nitride, boride, silicide, or carbide, a filler material, and a carbonaceous matrix. The precursor to this material contains nanoparticles or particles of boron, silicon, iron, a refractory metal, or a refractory metal hydride, an organic compound having carbon and hydrogen, and a filler material. Multilayered materials are also disclosed.

5 Claims, 17 Drawing Sheets

(51) Int. Cl.
  *C04B 35/573* (2006.01)
  *C04B 35/56* (2006.01)
  *C04B 35/65* (2006.01)
  *B32B 18/00* (2006.01)
  *C04B 35/565* (2006.01)

(52) U.S. Cl.
  CPC ............... *C04B 2235/3886* (2013.01); *C04B 2235/422* (2013.01); *C04B 2235/483* (2013.01); *C04B 2235/5454* (2013.01); *C04B 2235/658* (2013.01)

(56) References Cited

U.S. PATENT DOCUMENTS

| | | |
|---|---|---|
| 8,822,023 B2 | 9/2014 | Keller et al. |
| 8,865,301 B2 | 10/2014 | Keller et al. |
| 9,045,374 B2 | 6/2015 | Keller et al. |
| 9,403,723 B2 | 8/2016 | Keller et al. |
| 9,469,572 B2 | 10/2016 | Keller et al. |
| 9,580,359 B2 | 2/2017 | Keller et al. |
| 9,611,179 B1 | 4/2017 | Keller et al. |
| 9,637,416 B2 | 5/2017 | Keller et al. |
| 9,957,199 B2 | 5/2018 | Keller et al. |
| 10,189,747 B2 | 1/2019 | Keller et al. |

* cited by examiner

NANO-CRYSTALLINE REFRACTORY METAL CARBIDES, BORIDES OR NITRIDES WITH HOMOGENEOUSLY DISPERSED INCLUSIONS This application claims the benefit of U.S. Provisional Application No. 62/620,595, filed on Jan. 23, 2018. The provisional application and all other publications and patent documents referred to throughout this nonprovisional application are incorporated herein by reference.

TECHNICAL FIELD

The present disclosure is generally related to nanoparticle-containing ceramic composites.

DESCRIPTION OF RELATED ART

Refractory transition metal carbides, borides, and nitrides have the highest known melting points (2600-3900° C.) out of all engineering materials. They also offer outstanding hardness, chemical inertness, wear resistance, electrocatalytic activity, electrical and thermal conductivity, and neutron absorption. Refractory metal carbides and borides are typically prepared by powder metallurgy methods such as hot press sintering. Ordinarily, these techniques, which are both energy and time intensive, yield metal carbide ceramic composites that have a large granular structure, broad ceramic particle and grain size distribution, and are, subsequently, brittle. Powdered metal nitrides can be produced from metal particles in a flow of nitrogen but have to be formulated into shaped components under pressure and high temperatures. Films, fibers, and powders of these ceramics have been made from polymeric precursors, but neither polymer-derived ceramics nor reactive melt infiltration processes yield dense, pure, monolithic, and nanocrystalline metal carbides or metal nitrides.

Since the late 1960s, there has been an interest in high temperature ceramic materials for applications such as tools for grinding/machining, ball bearings, armor components, reinforcement fibers and fillers (integrated in other materials), and turbine blades of vehicles and aircraft. However, these materials have found no success in structural applications, due to their brittleness, weakness in shear and tension, and poor shock resistance. More recently, there has been a resurgence of interest in ultra-high temperature materials for high-speed air and space vehicles. These vehicles, which include both single-use (expendable) and multi-use (reusable) systems, include manned and unmanned platforms that travel through various layers of atmosphere and/or space, and include a propulsion system (such as an air-breathing engine and/or a rocket motor) and/or are unpowered. These vehicles operate at sufficiently high velocities to generate high heat (in excess of 2,200° C.) and potential ablation degradation problems for leading edges and nose tips along with any propulsion system components. In order to offer reliable and durable performance, engine components must meet several requirements: high melting temperature, high strength, well-defined thermal conductivity, and ablation and environmental resistance (oxidative resistance). Successful large-scale implementation of these high-performance engineering solutions is contingent on the development of appropriate materials that can be easily processed into shaped components with the required thermomechanical and thermochemical demands and maintain their exceptional properties without active cooling systems at temperatures greater than 2200° C. The refractory interstitial transition metal carbides and borides are extremely hard and resist chemical, oxidative, ablative, or thermal damage. Unfortunately, they are also brittle and difficult to machine. Furthermore, these materials, in their bulk state, exhibit innate performance maxima that limit the potential capabilities of these materials. For example, densified pure boron carbide exhibits strain softening during rapid ballistic impacts and loses its strength. Intrinsic electron band structures of ceramics limit their respective electrical and thermal conductivities. These nanoscale design and macroscale industrial processing challenges do not yet have controlled, optimized solutions. However, the present disclosure allows for nanoscale and microscale inclusions that affect the densities, grain size, oxidation resistance, strength and toughness, and electronic band structure that are not bound by inherent properties of the surrounding carbon matrix and that allow for very high levels of customization and optimization. Furthermore, this disclosure includes macroscale layer and laminate designs that further tailor ceramic composites and allow combinations of materials, which exceed the individual limits of their components, to function at high performance levels.

Beyond high-temperature and high-strength engineering applications, there is current interest in metal carbides with small particle size and high surface area as catalysts. Nanostructured tungsten carbide (WC) is a promising example. Selected metal carbides, such as SiC and WC, offer high catalytic efficiencies that compete with Pt/Pd/Ru, but are a much less expensive and more durable material alternative. Since they offer high thermal stability and chemical inertness, they withstand chemical reactions (driven by high temperature or electropotential) and retain high surface areas without catalyst poisoning, coarsening, or dissolution. These materials show promise in the anodes of direct methanol fuel cells (DMFC), which oxidize methanol and electrochemically split water. Strong chemisorption of CO on the noble metals makes these electrocatalysts susceptible to CO poisoning, blocking the active site for methanol oxidation. Consequently, the discovery of less expensive catalysts such as WC, which resists loss of its surface area to CO, facilitates large-scale commercialization of DMFCs. Our approach, which incorporates electrically conductive inclusions into the ceramic matrix, yields customizable shaped catalysts with tunable surface areas and high electron transport capabilities. Subsequently, this method may be used to manufacture nanostructured metal carbide catalysts for electrochemical energy storage, generation, and conversion.

BRIEF SUMMARY

Disclosed herein is a composition comprising: nanoparticles of a metal nitride, boride, silicide, or carbide; a filler material; and a carbonaceous matrix.

Also disclosed herein is a composition comprising: a metal component selected from nanoparticles or particles of boron, silicon, iron, a refractory metal, or a refractory metal hydride; an organic compound consisting of carbon and hydrogen; and a filler material.

Also disclosed herein is a composition comprising at least two laminated layers, each layer comprising: nanoparticles of a metal nitride, boride, silicide, or carbide; and a carbonaceous matrix. At least two of the layers comprise different elements or different proportions of the same elements.

Also disclosed herein is a composition comprising at least two layers, each layer comprising: a metal component selected from: nanoparticles or particles of boron, silicon, iron, a refractory metal, or a refractory metal hydride; and an organic compound consisting of carbon and hydrogen.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
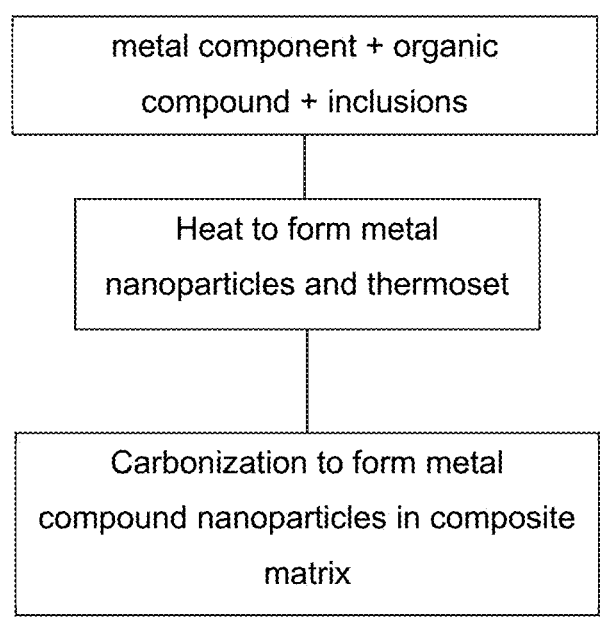
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

This disclosure concerns a method for in situ synthesis of nanocrystalline refractory metal nitrides, borides, silicides, and carbides, with homogeneously dispersed inclusions, macroscale layers/laminate composite material structures, and combinations of pure ceramics and those with one or more dispersed inclusions incorporated into layered structures. The method uses Group III-VI metals, metal oxide nanoparticles, and/or carbon nanostructures and embeds them within a carbon matrix. The synthesis method uses an inert atmosphere, such as nitrogen and/or argon, in a single-step process that, depending on customizable reaction methods, yields a shaped ceramic composite monolith with structural integrity, a powder with a homogeneous composition of one or more phases of ceramics or carbon nanostructures, or a layered macrostructure composed of solid ceramic monoliths and one or more nanostructured ceramic or carbon materials homogeneously dispersed through each individual laminate. The synthesis method allows control over the crystallite grain size, density, shape, mechanical properties, hardness, magnetic susceptibility, radiation shielding, and electrical/thermal conductivity. The material is designed for various engineering applications and may withstand temperatures up to and in excess of 3000° C.

Refractory metal carbide, boride, silicide, and nitride ceramics offer higher melting points (>3000° C.) than any other engineering materials. In order to synthesize ceramic components and dense shapes, the fabrication process subjects transition metal carbide/boride/nitride powders to hot press sintering, which requires extremely high pressures (>200 MPa) and temperatures (>2000° C.). Powdered metal carbide and boride precursor fabrication requires independent synthesis from metal particles, salts, oxides, and carbon (graphite or amorphous carbon) in a reducing hydrogen atmosphere at high temperatures (>2000° C.) to ensure high conversion to powdered metal carbides. Metal nitrides require spark plasma sintering, high-temperature autoclave treatment of polymers or metal salts, or reduction-nitridation of metal oxides. Boron carbide is typically prepared by reduction of boron trioxide with carbon or magnesium in presence of carbon in an electric arc furnace. Silicon carbide combines silica and carbon in a graphite resistance furnace at temperatures between 1600 and 2500° C. These processes are all expensive, energy-demanding, and difficult to scale up for industrial production. Sintered refractory ceramics exhibit grain coarsening and granularity of individual agglomerated particles, which embrittles these materials. Furthermore, optimal and well-tuned materials synthesis and processing conditions yield monolithic single-phase ceramics, which, in their intrinsic state, have well-defined structures and theoretical performance (melting point, oxidation resistance, strength, and thermal and electrical properties). Any efforts that aim to supersede these limits and achieve high-performance materials must design heterogeneous composites at the nanoscale (nanocrystalline phases included into the monolithic ceramic matrices) and/or macroscale (layers of ceramics assembled together into a solid laminated structure). However, technical difficulties prevent effective homogeneous dispersions of inclusions into these ceramic materials. Furthermore, layered ceramics suffer from interfacial strain and lattice mismatch and, to date, have not produced mechanically strong, well-bonded composites. Therefore, there is a need for a previously undeveloped cost-effective method that yields high-purity ceramics with embedded inclusions and/or macroscale layers with customizable properties.

The disclosed synthesis method uses a two-step process. The first step mixes together the precursor composition that contains the following key ingredients: (1) metal sources (metal powder and/or metal hydride micro/nanopowder, such as W, Ta, Hf/$HfH_2$, Ti/$TiH_2$, B, and Zr/$ZrH_2$); and (2) meltable acetylenic-containing aromatic polymeric resin that contains solely carbon and hydrogen atoms. Additionally, inclusion of fiber reinforcement (carbon, ceramic) can also be achieved by slurry methods using organic solvents in the mixture followed by removal of that solvent. Samples are heat-treated in tube furnaces or microwave ovens (magnetrons/gyrotrons/etc.) with no applied pressure and under vacuum or flowing gas (nitrogen or argon) conditions. The materials convert into shaped thermoset solids at temperatures below 500° C. Further heating to 1000-1500° C. yields metal ceramic matrix composite. Heating in an inert atmosphere (argon) promotes synthesis of refractory metal carbide, boride, nitride-carbon, boron carbide, silicon carbide matrix composites with or without fiber reinforcement, while heating in a nitrogen atmosphere promotes synthesis of refractory metal nitride-carbon, boron nitride or silicon nitride matrix composites with or without fiber reinforcement.

The first step also incorporates (3) secondary phase (oxides, carbides, borides, nitrides, carbon nanostructures, boron nitride nanotubes, macroscale beads/rods/spheres/etc.). The precursor compositions can also contain a combination of different metal compounds that will lead to a mixture of ceramics in the composite, which could be beneficial for specific applications. These precursors are pulverized/blended/mixed together for extended periods of time using a mortar and pestle, shaker, attrition mill, jet mill, or a ball mill for a prescribed length of time. The resulting powder is homogeneous and contains microparticles, agglomerates, or nanoparticles. Secondary phase inclusions are distributed throughout the material in a manner that depends on the mixing mechanism and intensity and may be customized for specific desired end structures.

Also disclosed are formulations of layered refractory metal carbide, boride, nitride carbon, boron carbide, and silicon carbide-matrix composites with or without embedded inclusions as described above. The layers are stacked on top of each other using cold-pressing with or without adhesive. As an additional structural reinforcement process, carbon fibers may be incorporated into individual layers or interwoven between layers.

Both variations are pressed into various shapes with different dimensions, and heated until conversion into shaped thermoset forms. The first variation may be heated as a powder, which, subsequently, results in a metal ceramic powder with embedded and properly distributed inclusions. Depending on the specific chemistry of the resulting ceramic, the tough, solid shaped composite can be used for structural and electronic applications and at temperatures that exceed 3000° C.

A method was developed to produce refractory metal (Ti, W, Nb, Zr, Mo, Cr, V, Ta, and Hf) carbides, borides, and nitrides in powdered and shaped solid configurations from milled precursor compositions. Precursor material mixtures, which are initially in powder form and can either remain powders or be cold-pressed into various shapes, contain pure metals or metal hydrides that are embedded in carbon-rich (and, optionally, nitrogen-rich) polymer resins. The ceramics are produced as nanoparticles, microparticles, or dense shapes with nanocrystalline domains.

The precursor preparation step combines a) metal particles or metal hydrides (which desorb hydrogen at high temperatures and convert to similar metal particles) with b) carbon precursors that melt and contain only carbon and hydrogen as a powder composition. The carbon sources are melt-processable aromatic-containing acetylenes or low molecular weight polymers that exhibit extremely high char yields. The carbon precursor contains only C and H to insure that heteroatoms are not incorporated into the interstitial sites of the metal nanoparticles during the reaction to produce the nanocrystalline metal carbide and/or metal nitride at temperatures up to 1500° C. under inert atmospheres. In addition to the metal and carbon precursors, which form the basis of the bulk metal matrix, the first step also incorporates inclusions into the material. These may be in forms of metal oxides ($Al_2O_3$, $SiO_2$, etc.), metals/semimetals (boron, silicon, iron, vanadium, etc.), carbides and nitrides (SiC, BN, etc.), carbon allotropes (nanotubes, graphene, nanodiamond, etc.), polymers (melamine, polyurea, polydopamine, etc.), and other similar materials. These inclusions may be nanopowders, micropowders, beads/spheres, flakes, and other dimensions and form factors. The initial composition is mixed or milled and either cold-pressed into a desired shape or used as a powder. Depending on the desired configuration, multiple layers of the same or different precursor mixtures, containing none or some inclusions, may be pressed together to create layered structures. The process may use cold-pressing, hand-pressing, doctor blading, screen printing, or thermal spraying methods to enjoin different layers. The layers may include an adhesive or another conduit material between the different laminates.

Precursor materials are subsequently placed inside of a tube furnace and, under no applied pressure, heated under flowing gas conditions. The material is subsequently thermally converted to a stable thermoset with metal/metal hydride particles embedded in a rigid polymer matrix. The metal carbides or metal nitrides form between 600-1000° C. under inert conditions from reaction of the highly reactive metal particles with either the carbon precursor (degradation above 500° C.) or nitrogen gas, respectively, but the reaction can be made to occur faster at higher temperatures. Further thermal treatment under argon or nitrogen atmospheres converts the powdered composition into metal carbides or metal nitrides embedded in a carbon matrix. The appropriate pure metal powders react directly with the carbon in the acetylenic resin, while metal hydride particles first undergo in situ transformation into metal particles by thermally decomposing metal hydrides into metal and hydrogen gas. Any inclusions in the structure may remain in their original state, react with either the enveloping metal/carbon/resulting ceramic matrix, or thermally transform to different phases. All enveloping carbon may be removed by oxidative (air) thermal exposure of the powdered mixture, which leaves solely metal carbide or metal nitride nanoparticles with nanocrystalline domains.

One method (FIG. 1) starts with a metal component, an organic compound, and a filler. The metal component may be nanoparticles or particles of boron, silicon, iron, a refractory metal, or a refractory metal hydride. (As used herein, the term "metal" includes boron and silicon.) Suitable metal components include, but are not limited to, tungsten, tantalum, hafnium, hafnium hydride, titanium, titanium hydride, zirconium, zirconium hydride, and vanadium.

The organic compound consists of only carbon and hydrogen atoms, such as 1,2,4,5-tetrakis(phenylethynyl)benzene (TPEB) or a prepolymer thereof. Other phenylethynyl benzene compounds are also suitable.

The filler material may be any particle or fiber that maintains its structural integrity at the temperatures used to make the ceramic material. The filler may or may not react with the other components. Suitable fillers include, but are not limited to, an oxide, aluminum oxide, a carbide, a boride, a nitride, boron nitride, a carbon nanostructure, graphene nanoplatelets, boron nitride nanotubes, macroscale beads, macroscale rods, macroscale spheres, and SiCN beads.

Figure 2:
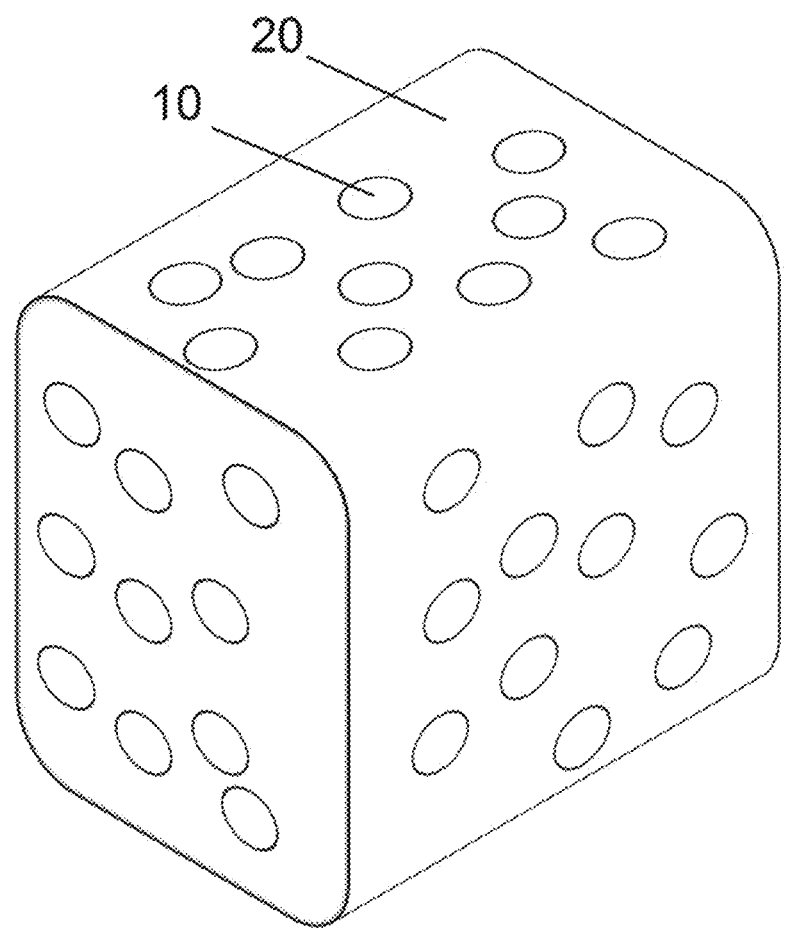
FIG. 2 schematically illustrates particles 10 embedded in a thermoset matrix 20.

The three components are combined and heated in an inert atmosphere such as nitrogen or argon. The heating is performed at a temperature that causes decomposition or reaction of the metal component to form nanoparticles in a metal nanoparticle composition. In this step, a metal hydride may decompose to form metal nanoparticles. The organic compound may also polymerize to a thermoset so that the metal nanoparticle composition will have a fixed shape. The shape may be determined by placing the initial components in a mold. The metal particles 10 would then be dispersed throughout the thermoset 20 as shown in FIG. 2.

In a second heating step, the metal nanoparticle composition is heated in an inert atmosphere, argon, or nitrogen at a temperature that causes formation of a ceramic comprising metal nitride, boride, silicide, or carbide nanoparticles and the filler material in a carbonaceous matrix. This ceramic material may have the same shape as the metal nanoparticle composition, and in this case would not be a powder.

Figure 3:
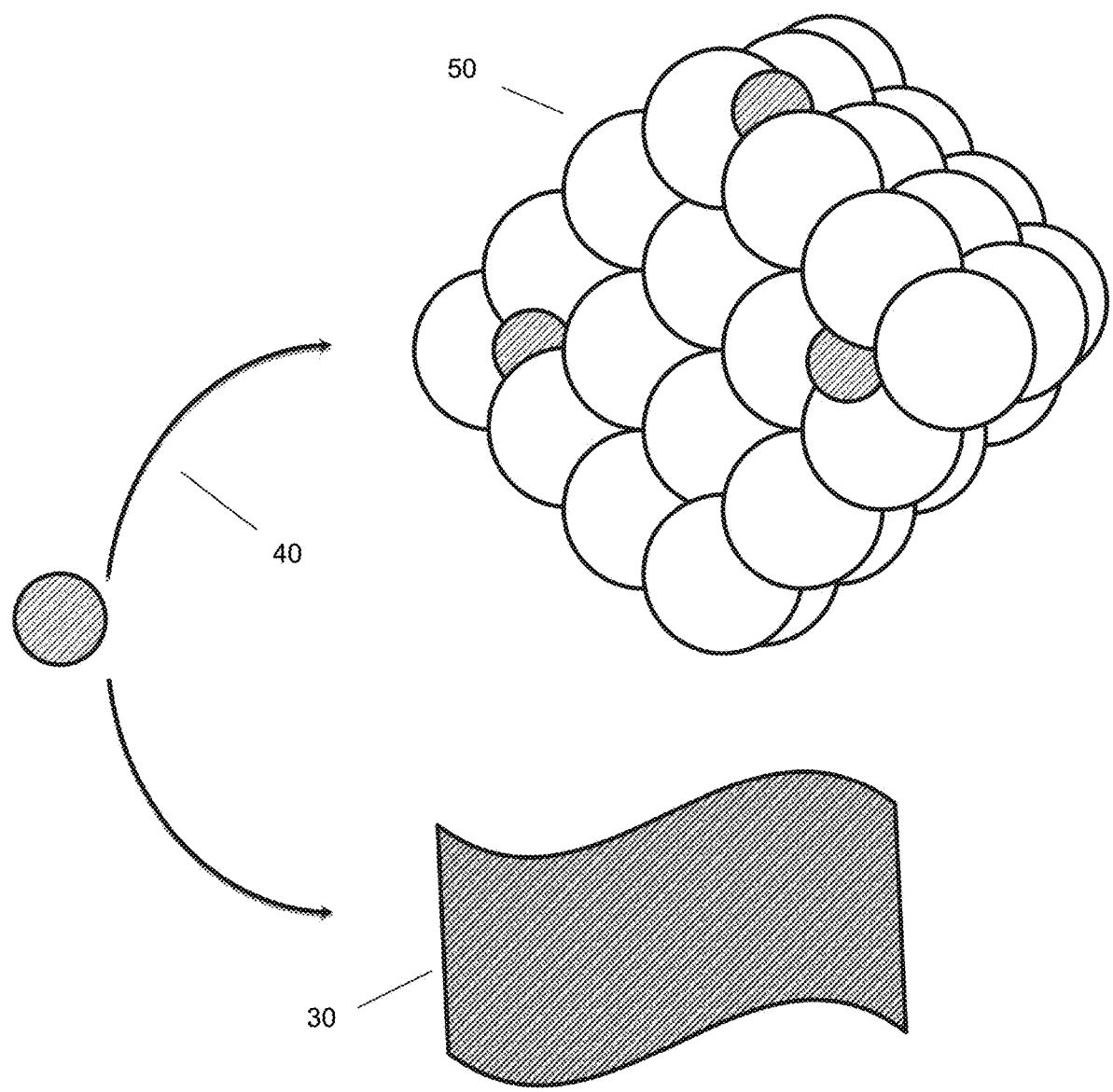
FIG. 3 schematically illustrates the transfer 40 of carbon atoms from the carbon matrix 30 to the nanoparticle 50.
Figure 4:
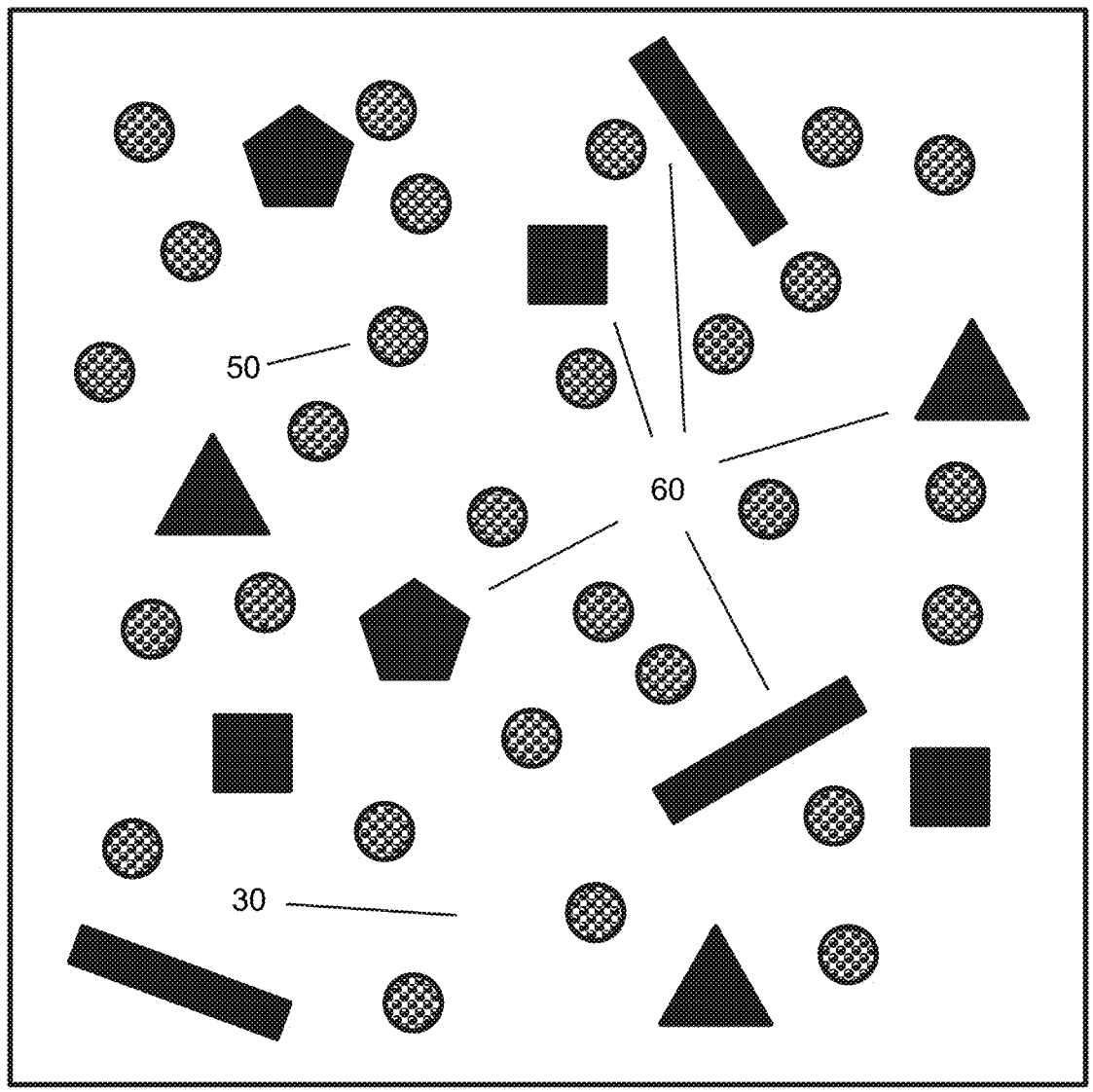
FIG. 4 schematically illustrates nanoparticles 50 and inclusions 60 in a carbonaceous matrix 70.

FIG. 3 schematically illustrates the transfer 40 of carbon atoms from the carbon matrix 30 to the nanoparticle 50. FIG. 4 schematically illustrates nanoparticles 50 and inclusions 60 in a carbonaceous matrix 70. Example heating steps and precursor materials are disclosed in U.S. Pat. Nos. 8,822,023; 8,865,301; 8,815,381; 8,778,488; and 10,189,747.

The nanoparticles in the ceramic may be for example, boron carbide, silicon carbide, iron carbide, iron boride, vanadium carbide, or tantalum carbide. The ceramic may comprise, for example, at least 5%, 10%, 50%, 90%, 95%, or 99% by weight of the nanoparticles and/or filler. The balance of carbonaceous matrix may be a small amount sufficient to adhere the nanoparticles together. As the nanoparticles are formed in situ, there is no particular minimum amount of matrix required.

Figure 5:
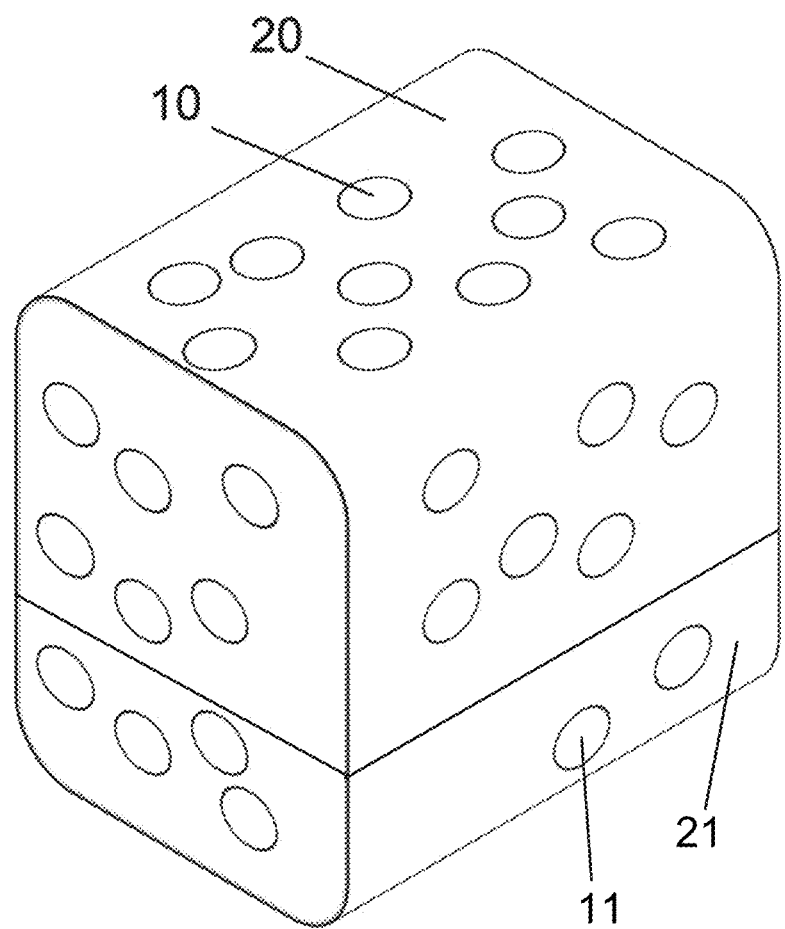
FIG. 5 schematically illustrates a multi-layer composite having particles 10, 11 embedded in thermoset matrices 20, 21.
Figure 6:
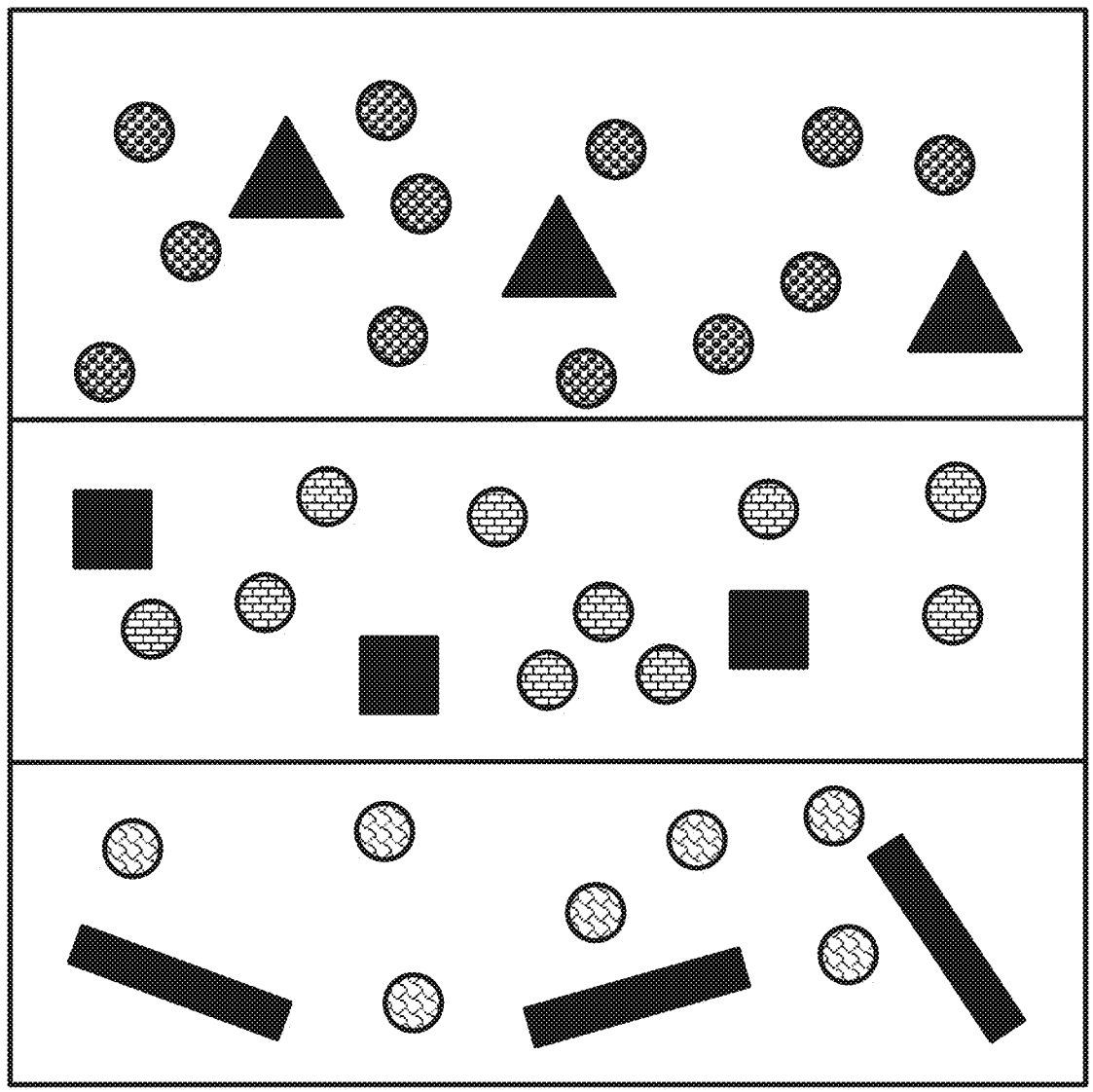
FIG. 6 schematically illustrates a multi-layer composite.

Another method uses multiple layers having two or more different metals and/or fillers, or different amounts of the same fillers. The precursor materials may be placed in a mold in layers so that a laminated thermoset and ceramic are formed. The use of fillers in the multilayered structure in optional. FIG. 5 schematically illustrates a multi-layer composite having particles 10, 11 embedded in thermoset matrices 20, 21. FIG. 6 schematically illustrates a multi-layer composite.

By varying the amount of metal compound that forms reactive metal particles relative to the polymer resin in step two, the amount of metal carbide or metal nitride within the final shaped ceramic composition can be changed with respect to the amount of carbon matrix in order to vary the properties of the resulting composition. The metal-carbide or metal nitride carbon-matrix compositions are expected to show enhanced toughness, owing to the presence of the relatively elastic carbon, which would exist in forms ranging from amorphous to nanotube to graphitic carbon. The approach has yielded several distinct chemistries of ceramic matrices with inclusions of metals, nanocarbons, and other ceramics that have yielded improved performance. The broad range of available structure highlights the universality of our approach.

Potential advantages and features of the disclosed products and methods include the following.

The method provides for a high-purity, high-yield method to synthesize pure refractory nanoparticle metal carbides, borides, nitrides or boron carbide and silicon carbide ceramics with nanocrystalline domains with secondary phases "inclusions" in powdered and shaped forms from a reaction of a meltable polymeric resin with the appropriate precursor compositions.

The method provides for formation of composites of shaped nanoparticle metal carbides, borides, nitrides or boron carbide and silicon carbide ceramics with nanocrystalline domains in a single-step method.

Regardless of the ratio of metal source to carbon source and the secondary phase, the metal ceramics form as nanoparticles with nanocrystalline domains. This is a highly desirable result, as it is generally accepted that homogeneous nanocrystalline composites of ceramics will have better properties than their (more common) microparticle-based counterparts.

Inclusions in materials allow the resulting composites to demonstrate properties that meet or exceed the intrinsic mechanical, electronic, and thermal maxima of the bulk carbides, nitrides, and borides that make up the overlaying ceramic matrix.

Inclusions control the basic properties of the resulting composites. They densify the resulting shaped ceramics, further reduce nanocrystalline grain sizes, and minimize thermally-induced stress and cracking of composites during synthesis.

Layered structures with good interfacial bonding between the layers can be achieved with the metal ceramic composites with or without a homogeneously dispersed secondary phase "inclusions" with the proper choice of precursor materials.

Layers and laminates may further improve the performance of bulk composites and exceed the properties of the same materials in single-layer, monolithic forms. Laminates allow high control over thermal conductivity and may be used to tune the temperature gradient across the material. Each layer may showcase different ablation resistance and, in a tuned combination approach, may improve the durability of a heat shield while minimizing its mass. Shock impedance mismatch may improve the ballistic performance of these composites without increasing the areal density of armor plates.

The synthetic process occurs under no applied pressure and at much lower temperatures than conventional synthesis and densification sintering methods for metal ceramics.

By its very nature, the process improves facile customization of metal ceramic composites by liquid molding procedures (injection molding, vacuum molding, spreading, thermal spray, etc.), which is a far less costly and involved process than machining a hot press sintered material.

The native presence of an "elastic" carbon matrix allows for toughening of the inherently brittle ceramics. The carbon permits operation of the toughened ceramic at extremely high temperatures, owing to carbon's high melting point (>3000° C.). Ceramic/carbon-matrix compositions are currently sought for these reasons, and the present method permits straightforward preparation of these composites in a single step, in contrast to the traditional means of first forming the ceramic powder and then preparing the carbon-matrix composite under sintering conditions. Also, the ratio of ceramic to carbon is easily tuned based only on the ratio of metal-compound to carbon-precursor.

This simple process for formation of metal ceramic composites with homogeneously embedded "inclusions" and/or layered macrostructures can be extrapolated and applied to oxides, silicides, and other high-temperature refractory materials.

Examples of applications that could benefit from the two aspects disclosed include advanced engine components and automobiles, where increased operation temperature and mechanical integrity could translate into tremendous economic advantages. Such tough, easily shaped ceramic composites are critical to the next generation of jet engines, which are being designed to operate at higher internal temperatures and stresses than those in current service, and in advanced automobile engines and supporting components. The rails of a railgun would be improved with hard, high-temperature, conductive ceramic coatings. The materials could be used as tough, high temperature insulators and in the design of hard, conductive rails with superior durability (no grooving). If these materials are doped with inclusions and showcase high electronic conductivity, they may serve in high-temperature electronics applications. These materials can be fabricated into high temperature ship deck plates for aircraft carriers, which require high toughness and superior heat-resistant composites. Boron carbide and silicon carbide composites provide lightweight, tough, and hard ceramics molded in shaped structures that are in high demand for superior military armor (XSAPI and ESAPI plates) components. Such materials could provide vehicle and personnel protection against emerging ballistic threats, such as tungsten carbide-based armor-piercing rounds. Conversely, these materials may serve as kinetic projectiles and either improve the penetration capability or ablation resistance (crucial for railgun warheads) of new ammunition. The ability to fabricate pure, tough, and shaped refractory metal carbides or metal nitride components in two steps improves their economic viabilities and mission capabilities of a broad array of military systems.

The following examples are given to illustrate specific applications. These specific examples are not intended to limit the scope of the disclosure in this application.

EXAMPLE 1

Boron carbide/silicon carbide—Boron carbide ($B_4C$) was synthesized from a mixture of boron powder (B) and TPEB. Additionally, silicon metal (Si) was included into the precursor mixture prior to blending according to the following weight percentages (as wt. % of the total mixture): 5.5 wt. %, 11.0 wt. %, 16.5 wt. %, 24.8 wt. %, 50.0 wt. %, 75.2 wt. %, 83.5 wt. %, 89 wt. %, and 96.5 wt. % by thermal treatment to 1500° C. Table 1 summarizes the densities of disks (as determined using Archimedes' principle) and fraction of expected theoretical maximum density (assuming $B_4C$ and SiC products with 2.52 g/cm$^3$ and 3.21 g/cm$^3$ densities, respectively, and normalized by the wt. % of Si in each sample).

TABLE 1

| Material Composition | Volumetric Density | Fraction of Theoretical Maximum Density |
|---|---|---|
| $B_4C$ 100.0%/0.0% SiC | 2.32 ± 0.08 g/cm3 | 91.5 ± 3.7% |
| B4C 94.5%/5.5 wt. % Si | 2.41 ± 0.05 g/cm3 | 93.71 ± 2.4% |
| B4C 89.0%/11.0 wt. % Si | 2.39 ± 0.06 g/cm3 | 91.3 ± 2.8%% |
| B4C 83.5%/16.5 wt. % Si | 2.38 ± 0.07 g/cm3 | 89.0 ± 3.6% |
| B4C 75.2%/24.8 wt. % Si | 2.42 ± 0.03 g/cm3 | 88.9 ± 1.5% |
| B4C 50.0%/50.0 wt. % Si | 2.58 ± 0.06 g/cm3 | 89.0 ± 2.8% |
| B4C 24.8%/75.2 wt. % Si | 2.50 ± 0.17 g/cm3 | 77.6 ± 8.7% |
| B4C 16.5%/83.5 wt. % Si | 2.39 ± 0.28 g/cm3 | 68.5 ± 16.7% |
| B4C 11.0%/89.0 wt. % Si | 2.40 ± 0.34 g/cm3 | 67.0 ± 21.61% |
| B4C 5.5%/94.5 wt. % Si | 2.23 ± 0.28 g/cm3 | 55.7 ± 19.4% |
| B4C 0.0%/SiC 100.0% | 2.27 ± 0.23 g/cm$^3$ | 57.3 ± 15.2% |

The microstructure of the $B_4C$ 75.2%/24.8 wt. % Si sample was obtained by scanning electron microscope (SEM). The resulting matrix showed uniform, dense, crystalline ceramic morphology. A corresponding elemental map of silicon showed the inclusion's uniform distribution throughout the matrix.

Figure 7A:
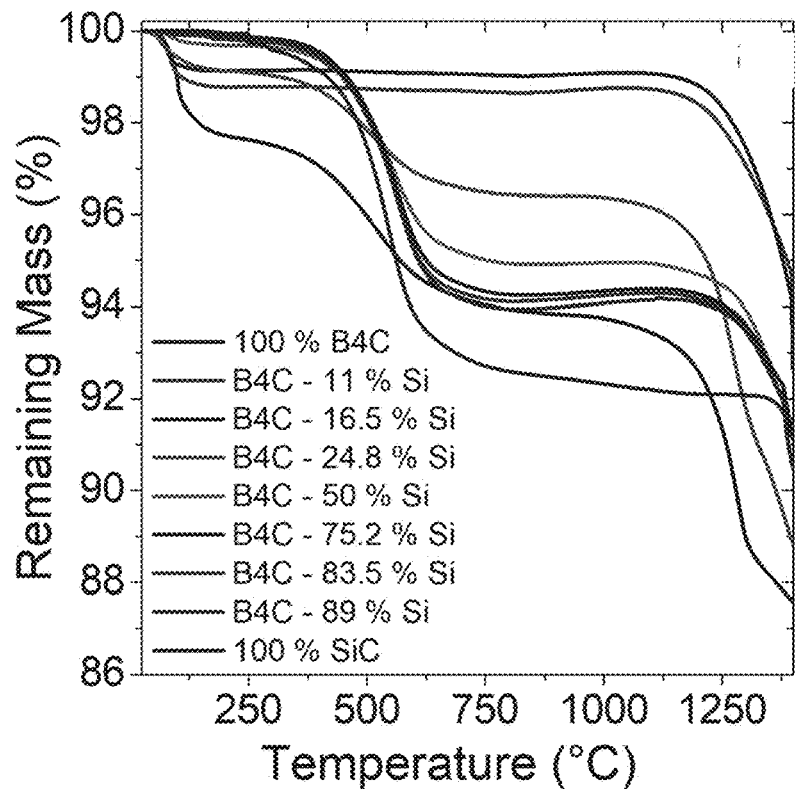
FIG. 7A is a plot of the mass change of the materials as a function of temperature for $B_4C/Si$ compositions.
Figure 7B:
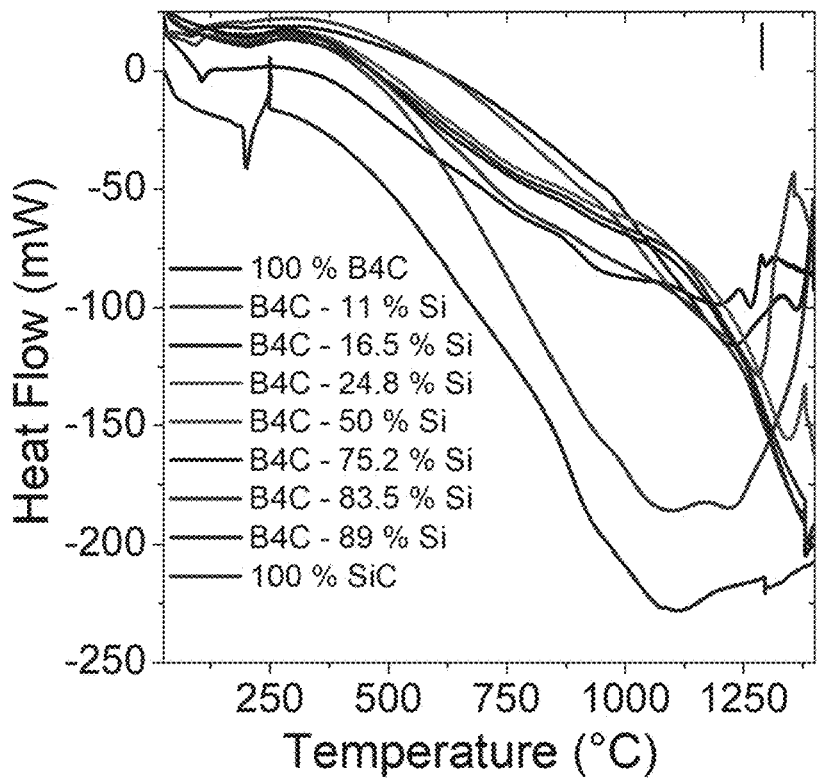
FIG. 7B is a plot of heat flow changes, which identify inflection points as key reaction transition conditions

The reaction profiles of the different compositions were analyzed using thermogravimetric analysis with a differential scanning calorimetry component (TGA-DSC). The test conditions resembled thermal treatments of the samples in argon in a tube furnace. FIG. 7A shows the mass change of the materials as a function of temperature and FIG. 7B shows heat flow changes, which identify inflection points as key reaction transition conditions.

Figure 8:
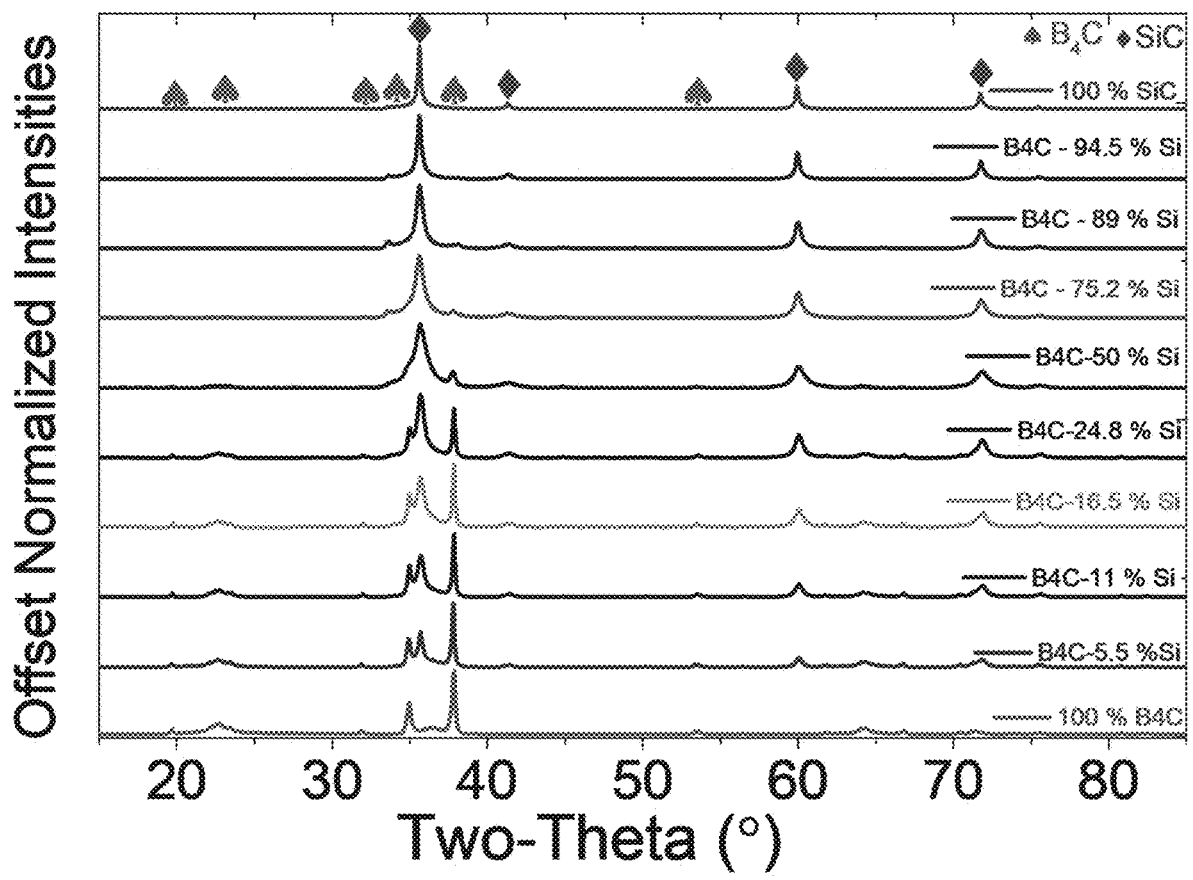
FIG. 8 shows X-ray diffraction (XRD) measurements carried out on the above compositions.

X-ray diffraction (XRD) measurements were carried out on selected compositions from this sample set. The patterns, along with peak identifications, are shown in FIG. 8. From the XRD data above, Rietveld refinement derived the phase composition and crystallite size for each material. They are summarized in Table 2.

TABLE 2

| Material Composition | SiC Composition | SiC Crystallite Size | $B_4C$ Composition | $B_4C$ Crystallite Size |
|---|---|---|---|---|
| $B_4C$ 100.0%/0.0% SiC | 0.0% | N/A nm | 100 | 21.7 nm |
| $B_4C$ 94.5%/5.5 wt. % Si | 10.4% | 15.1 nm | 89.6 | 23.3 nm |
| $B_4C$ 89.0%/11.0 wt. % Si | 19.1% | 12.1 nm | 80.9 | 27.4 nm |
| $B_4C$ 83.5%/16.5 wt. % Si | 25.5% | 13 nm | 74.5 | 30.2 nm |
| $B_4C$ 75.2%/24.8 wt. % Si | 32.5% | 15.6 nm | 67.2 | 31.1 nm |
| $B_4C$ 50.0%/50.0 wt. % Si | 29.6% | 8.7 nm | 70.4 | 13.8 nm |
| $B_4C$ 24.8%/75.2 wt. % Si | 72.2% | 11.0 nm | 27.8 | 24.5 nm |
| $B_4C$ 11.0%/89.0 wt. % Si | 80.0% | 7.5 nm | 20.0 | 1.2 nm |
| $B_4C$ 5.5%/94.5 wt. % Si | >99.0% | 5.2 nm | N/A | 1.3 |
| $B_4C$ 0.0%/SiC 100.0% | 100.0% | 18.2 nm | 0.0 | N/A |

EXAMPLE 2

Boron carbide/silicon carbide/iron carbide—Boron carbide ($B_4C$), silicon carbide (SiC) and equal (50 wt. % B; 50 wt. % Si) ratios of boron and silicon carbides ($B_4C$/SiC) were synthesized from mixtures of boron powder (B), silicon powder (Si), and TPEB. Additionally, 5 wt. % elemental iron (Fe) was added to each precursor composition prior to ball-milling. The remainder of the synthesis proceeded exactly as in Example 1 above. Table 3 summarizes the densities of disks, assuming that the theoretical composition of each sample included predetermined ratios of SiC and/or $B_4C$, as well as 5 wt. % $Fe_3C$.

TABLE 3

| Material Composition | Volumetric Density | Fraction of Theoretical Maximum Density |
|---|---|---|
| 95.0 wt. % $B_4C$/0.0 w. % SiC/5.0 wt. % Fe | 2.64 ± 0.07 g/cm$^3$ | 70.00 ± 3.7% |
| 0.0 wt. % $B_4C$/95.0 w. % SiC/5.0 wt. % Fe | 2.54 ± 0.05 g/cm$^3$ | 90.62 ± 4.5% |
| 47.5 wt. % $B_4C$/47.5 w. % SiC/5.0 wt. % Fe | 2.68 ± 0.09 g/cm$^3$ | 84.14 ± 3.7% |

Figure 9A:
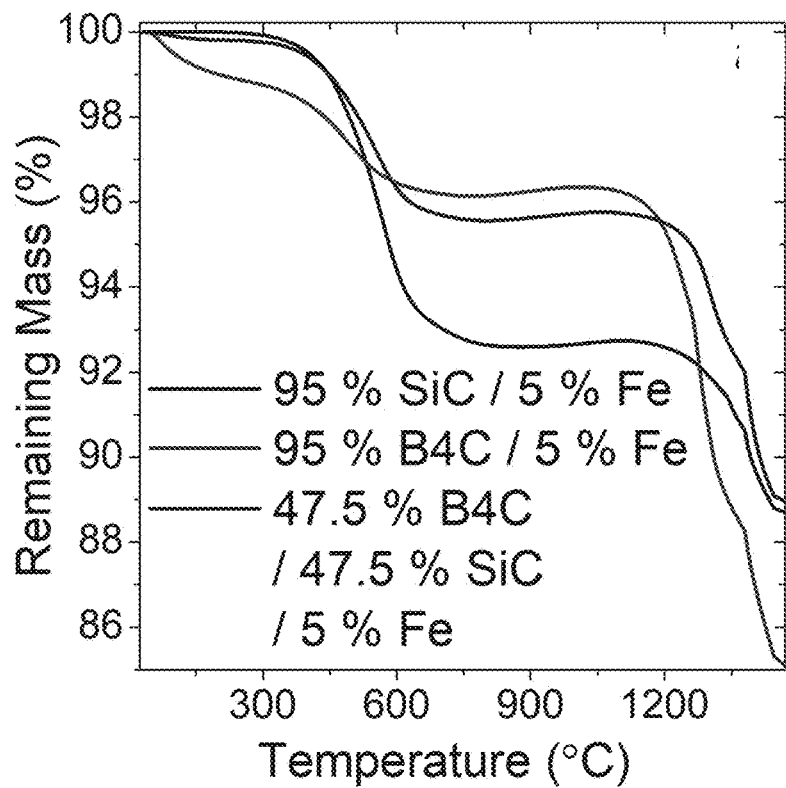
FIG. 9A is a plot of the mass change of the materials as a function of temperature for iron-containing compositions.
Figure 9B:
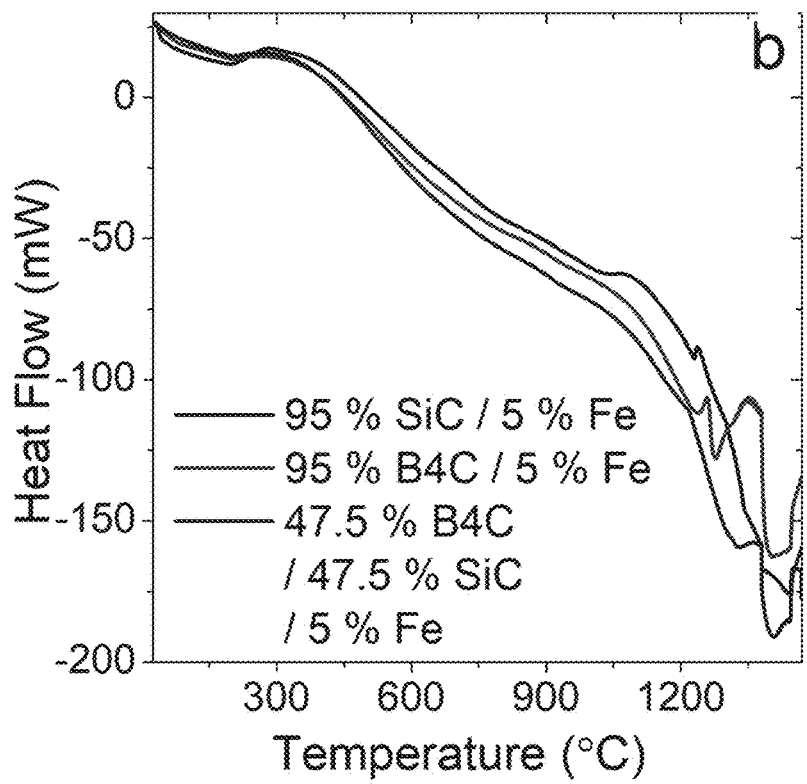
FIG. 9B is a plot of heat flow changes, which identify inflection points as key reaction transition conditions.

The reaction profiles of the different compositions were analyzed using TGA-DSC. The test conditions resembled thermal treatments of the samples in argon in a tube furnace. FIG. 9A shows the mass change of the materials as a function of temperature and FIG. 9B shows heat flow changes, which identify inflection points as key reaction transition conditions.

An SEM image of the $B_4C$ 95.0%/5.0 wt. % Fe sample showed that the ceramic was more homogeneous, rigid, and dense. No pores were observed. The corresponding elemental map of iron showed that it was evenly distributed throughout the boron matrix, despite being heavier than silicon.

Figure 10:
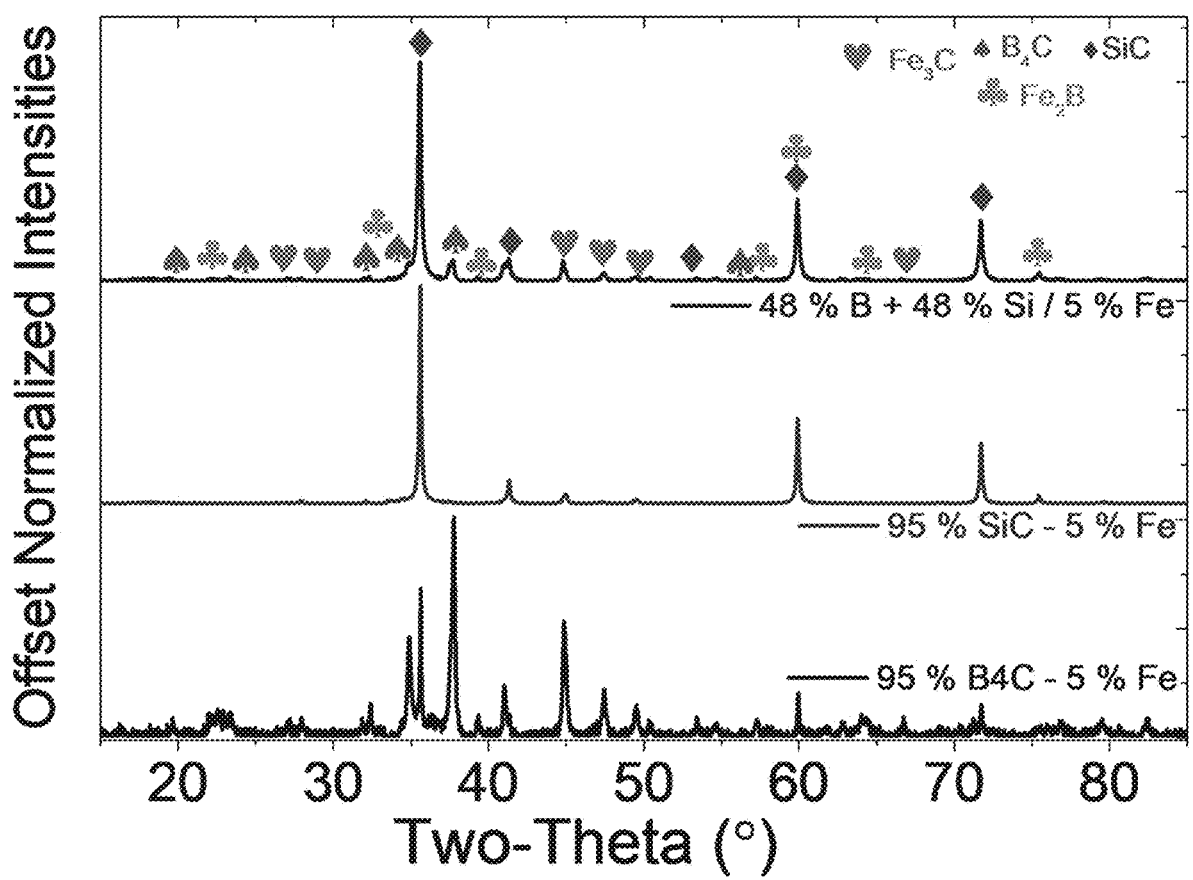
FIG. 10 shows XRD measurements carried out on the above compositions.

XRD measurements were carried out on the three compositions from this sample set. The patterns, along with peak identifications, are shown in FIG. 10. From the XRD data, Rietveld refinement derived the phase composition and crystallite size for each material. They are summarized in the Table 4.

TABLE 4

|  | 95 wt. % B + TPEB/ 5 wt. % Fe | 95 wt. % Si + TPEB/ 5 wt. % Fe | 47.5 wt. % B + TPEB/ 47.5 wt. % Si + TPEB/5 wt. % Fe |
|---|---|---|---|
| SiC composition | N/A | 94.4% | 64.4% |
| SiC crystallite size | N/A | 41.3 nm | 29.6 nm |
| $B_4C$ composition | 96.8% | N/A | 31.3% |
| $B_4C$ grain size | 24.9 nm | N/A | 138.5 nm |
| $Fe_3C$ composition | 0.5% | 5.6% | 2.5% |
| $Fe_3C$ grain size | 154.2 nm | 17.3 nm | 7.5 |
| $Fe_2B$ composition | 1.9% | N/A | 1.8% |
| $Fe_2B$ grain size | 55.9 nm | N/A | 65.8 |

EXAMPLE 3

Inclusions—These methods have also yielded several miscellaneous materials that contain bulk ceramic matrices and various inclusions. This approach has yielded hexagonal boron nitride embedded in SiC (95.0 wt. % SiC/5 wt. % BN); aluminum oxide nanoparticles embedded in $B_4C$ (80.0 wt. % $B_4C$/20 wt. % $Al_2O_3$); and graphene nanoplatelets (GNP) embedded in $B_4C$ (80.0 wt. % $B_4C$/20 wt. % GNP).

An elemental map of aluminum oxide embedded in boron carbide shows that the nanoparticles are evenly distributed throughout the carbide matrix, and the overall morphology resembled the one with embedded metals and described in Examples 1 and 2.

Figure 11:
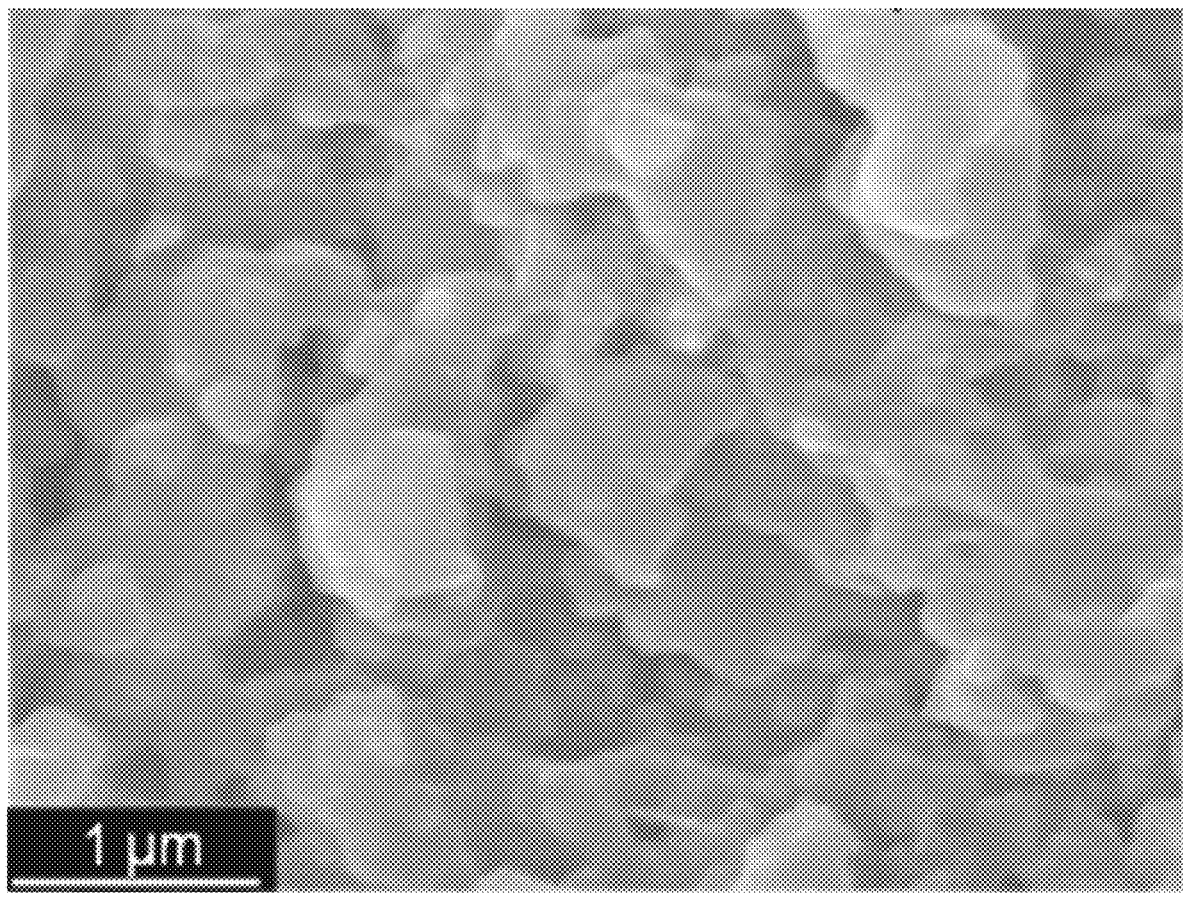
FIG. 11 shows the SEM-derived microstructure of $B_4C$ with graphene nanoplatelet inclusions.
Figure 12:
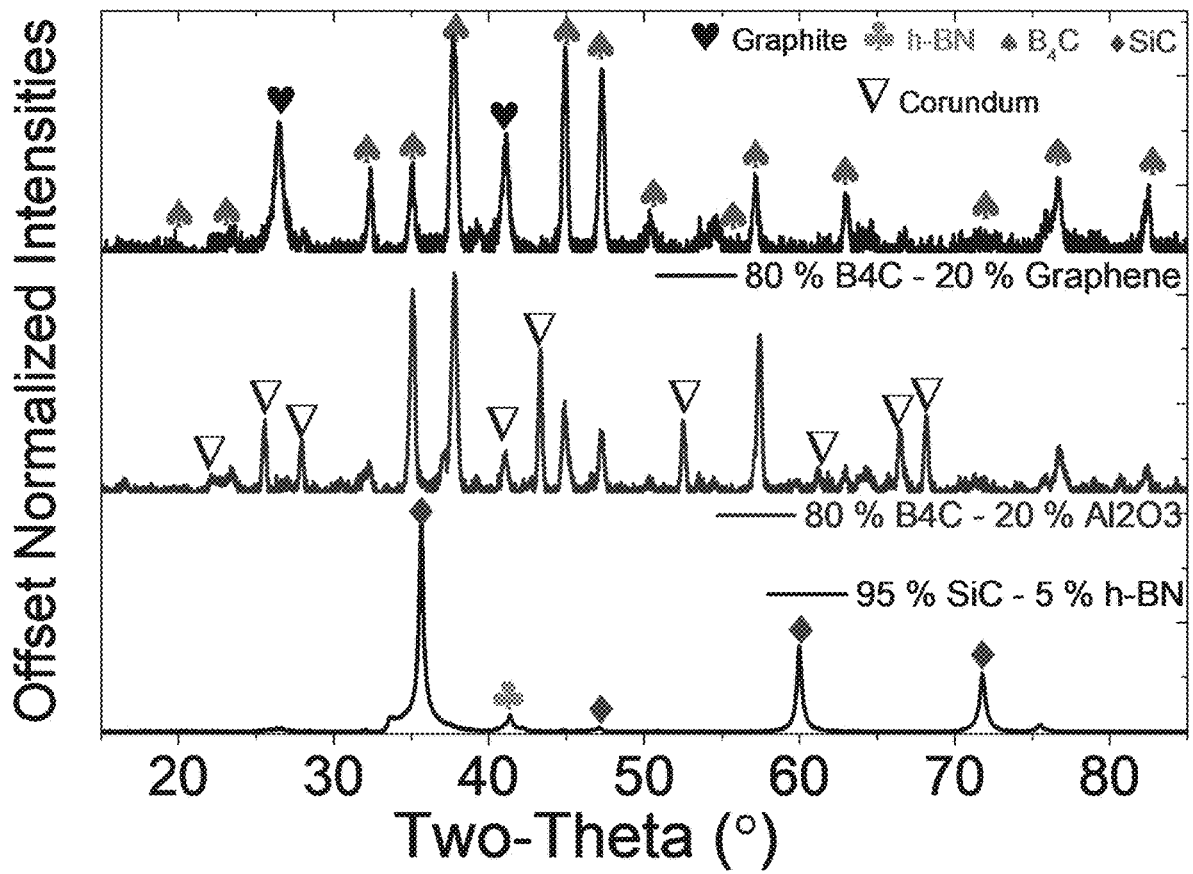
FIG. 12 shows XRD measurements carried out on compositions having other inclusions.

FIG. 11 shows the SEM-derived microstructure of $B_4C$ with graphene nanoplatelet inclusions. The graphene planar sheets are clearly visible. XRD measurements were carried out on the three different inclusion configurations in ceramic matrices. The patterns, along with peak identifications, are shown in FIG. 12. From this XRD data, Rietveld refinement derived the phase composition and crystallite size for each material. They are summarized in Table 5.

TABLE 5

|  | 95 wt. % Si + TPEB/5 wt. % h-BN | 80 wt. % B + TPEB/20 wt. % $Al_2O_3$ | 80 wt. % B + TPEB/20 wt. % Graphene |
|---|---|---|---|
| Main carbide matrix composition | 93.2% (3C-SiC) 16% (h-SiC) | 77.6% ($B_{12}C_3$) | 59.5% ($B_{12}C_3$) |
| Carbide matrix crystallite size | 15.8 nm | 26.2 nm | 26.3 nm |
| Main inclusion composition | 11.9% (h-BN) | 22.4% (corundum $Al_2O_3$) | 40.6% (graphitic carbon) |
| Main inclusion grain size | 7.6 nm | 53.0 nm | 17.0 nm |

EXAMPLE 4

Figure 13:
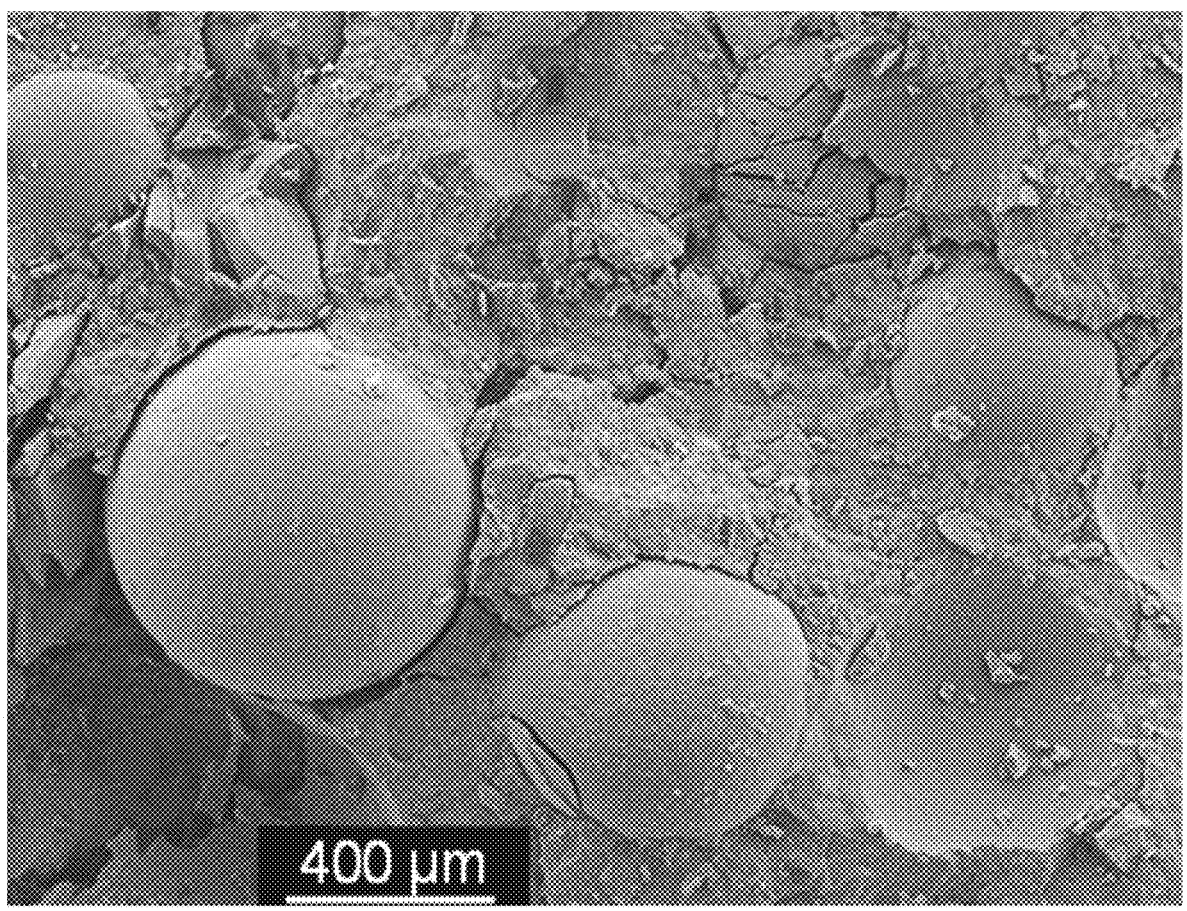
FIG. 13 shows an SEM of a $B_4C/SiCN$ composite.

Ceramic beads—In a separate approach, macroscale polymer-derived ceramic beads were integrated into a $B_4C$ matrix. These commercially available beads were composed of a SiCN derived from a polysiloxane precursor. The B+TPEB mixture was ball-milled using the same procedure as before. The beads were added to the blended mixture and mixed together using the ball-milling setup, with no grinding media present. The materials were subsequently cold-pressed into a pellet and thermally treated to convert the structure into a ceramic by heating to 1500° C. The scanning electron microscopy (SEM) image of the resulting microstructure is shown In FIG. 13.

EXAMPLE 5

Multilayered $B_4C$/SiC—The approach has also yielded several layered structures with heterogeneous and homogeneous layers, including some individual layers with inclusions that resemble the structures above.

Compositions of precursors for $B_4C$ and $B_4C$ with different fractions of SiC (similar to Example 1 above) were pressed together into layers with the structures shown in Table 6. They were subsequently converted to carbides using the same thermal processing conditions as before. Their densities are shown in Table 7.

TABLE 6

|  | Sample 1 | Sample 2 | Sample 3 | Sample 4 |
|---|---|---|---|---|
| Layer 5 |  |  |  | $B_4C$ 75.2% SiC 24.8% |
| Layer 4 |  |  | $B_4C$ 83.5% SiC 16.5% | $B_4C$ 83.5% SiC 16.5% |
| Layer 3 |  | $B_4C$ 89.0% SiC 11.0% | $B_4C$ 89.0% SiC 11.0% | $B_4C$ 89.0% SiC 11.0% |
| Layer 2 | $B_4C$ 94.5% SiC 5.5% | $B_4C$ 94.5% SiC 5.5% | $B_4C$ 94.5% SiC 5.5% | $B_4C$ 94.5% SiC 5.5% |
| Layer 1 | $B_4C$ 100.0% SiC 0.0% | $B_4C$ 100.0% SiC 0.0% | $B_4C$ 100.0% SiC 0.0% | $B_4C$ 100.0% SiC 0.0% |

TABLE 7

| Sample | Volumetric Density (total) | Fraction of Theoretical Maximum Density |
|---|---|---|
| Sample 1-2 layers | 2.31 g/cm³ | 91.1% |
| Sample 2-3 layers | 2.36 g/cm³ | 92.4% |
| Sample 3-4 layers | 2.39 g/cm³ | 92.8% |
| Sample 4-5 layers | 2.39 g/cm³ | 92.0% |

EXAMPLE 6

Multilayered $V_2C$/TaC—Samples of vanadium carbide ($V_2C$) and tantalum carbide (TaC) were prepared as individual disks and as layered materials from, respectively, mixtures of vanadium and TPEB and tantalum and TPEB. While each layer was homogeneous in nature, several different layered ceramic composite combinations were produced as shown in Table 8

TABLE 8

|  | Sample 1 | Sample 2 | Sample 3 | Sample 4 | Sample 5 |
|---|---|---|---|---|---|
| Layer 3 |  |  |  | TaC 100.0% | V$_2$C 100.0% |
| Layer 2 |  |  | V$_2$C 100.0% | V$_2$C 100.0% | TaC 100.0% |
| Layer 1 | V$_2$C 100.0% | TaC 100.0% | TaC 100.0% | TaC 100.0% | V$_2$C 100.0% |

Figure 14:
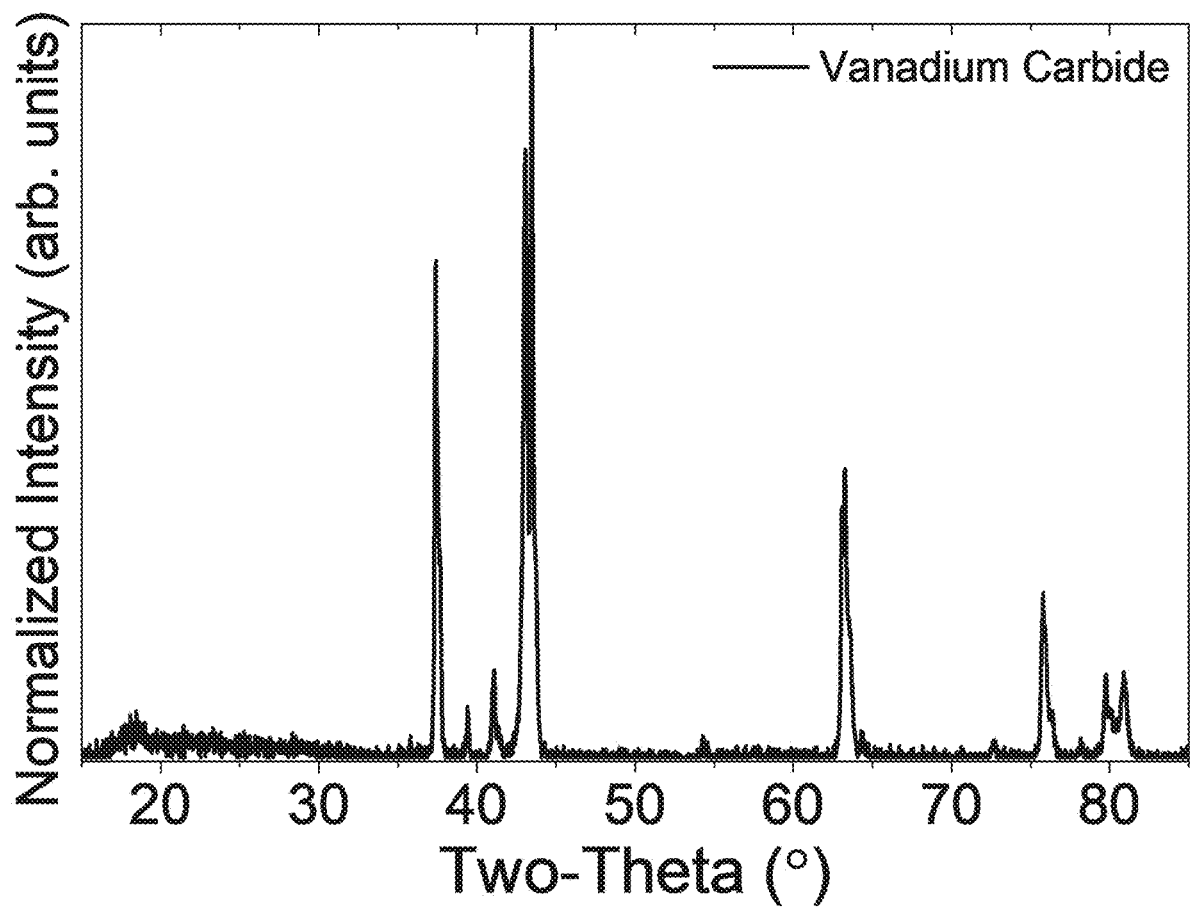
FIG. 14 shows an XRD pattern of vanadium carbide.
Figure 15A:
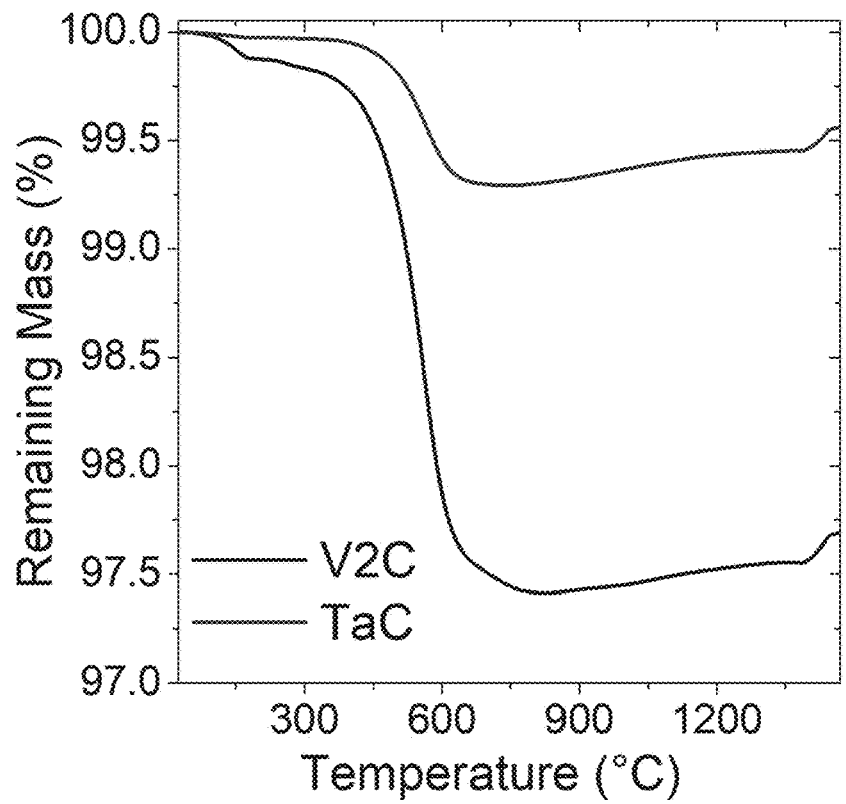
FIG. 15A shows TGA profiles of the pure V+TPEB and Ta+TPEB mixtures and their conversion to, respectively, $V_2C$ and TaC.
Figure 15B:
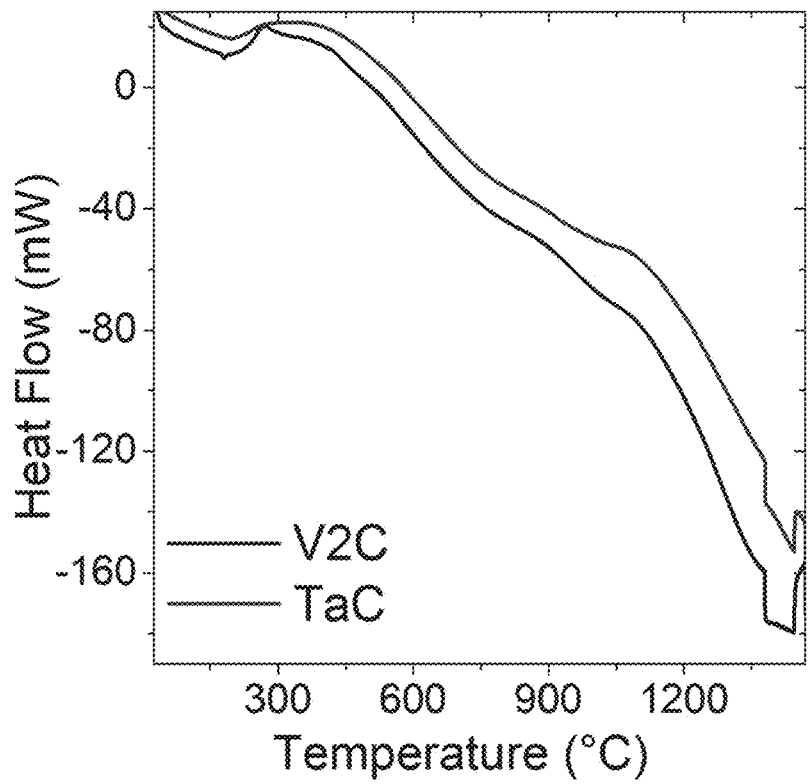
FIG. 15B shows the heat flow plot. (TaC is the upper curve.)

The crystal structure of the monolithic V$_2$C material (single layer) is shown in the XRD pattern in FIG. 14. The different reaction profiles of the pure V+TPEB and Ta+TPEB mixtures and their conversion to, respectively, V$_2$C and TaC, are described in the TGA-DSC plots in FIGS. 15A and 15B.

EXAMPLE 7

Figure 16:
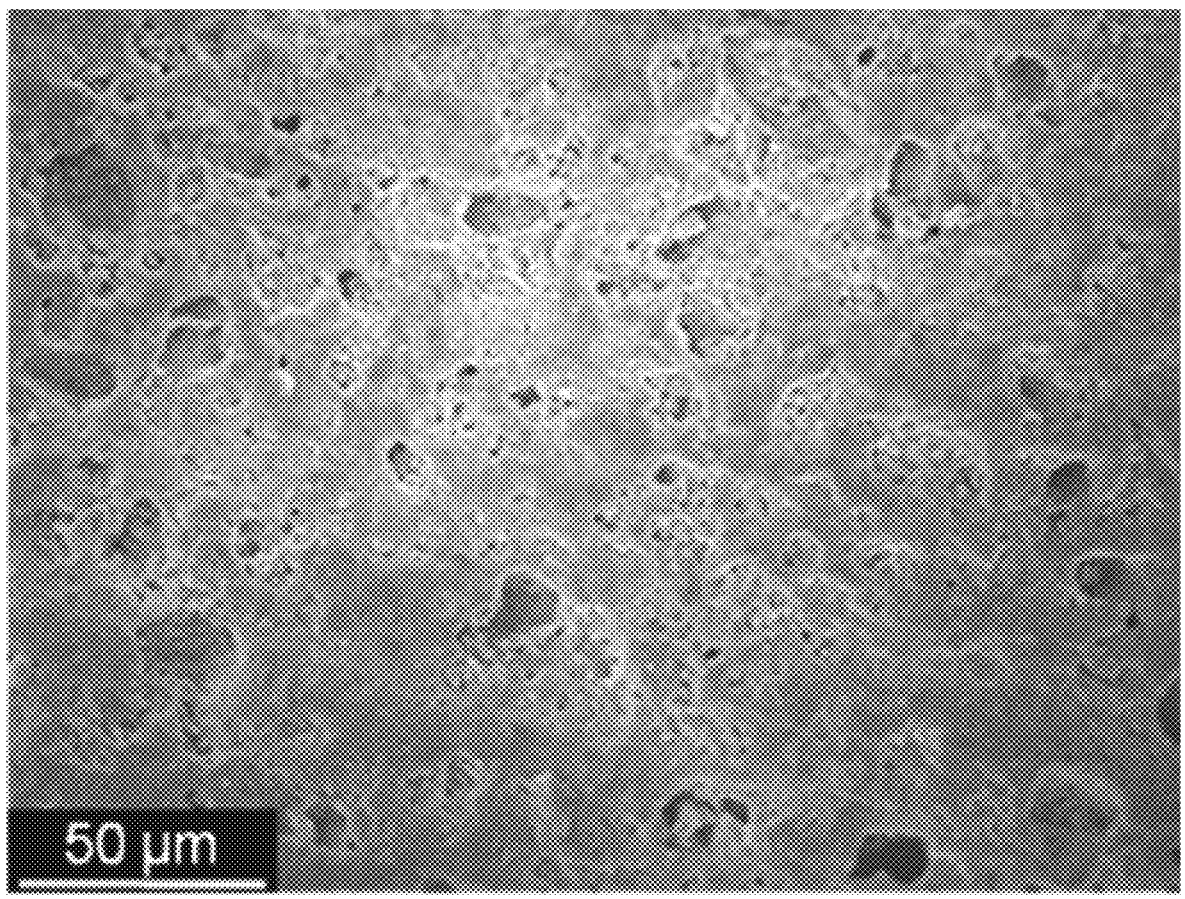
FIG. 16 shows an SEM image of the cross-section of a SiC/ZrC composite.

Multilayered SiC/ZrC—A ceramic monolith with two bonded layers of SiC and ZrC was synthesized by cold-pressing blended mixtures of Si+TPEB and ZrH$_2$+TPEB. The materials were converted into a ceramic using the same procedure as before. The SEM image (FIG. 16) of the cross-section of the sample shows a uniform interface between the two different ceramics.

EXAMPLE 8

ZrC with Embedded Carbon and Ceramic Inclusions—Ceramic monoliths consisting of an enveloping ZrC matrix with different synthesis modifications and inclusions were synthesized by blending together ZrH$_2$ (4.267 g), TPEB (0.639 g), and different secondary phases (0.238 g) during ball milling. The first sample was composed of a blend of ZrH$_2$ and TPEB that had been previously b-staged (heated to 220° C. for 60 minutes) and compacted into a disc at room temperature (referred to as "ZrC-basic"). The second sample was composed of a blend of ZrH$_2$ and neat TPEB and compacted into a disc at 220° C. (referred to as "ZrC-advanced"). The third sample was composed of a blend of ZrH$_2$, neat TPEB, and graphene nanoplatelets (referred to as "ZrC-graphene"). The fourth sample was composed of a blend of ZrH$_2$, neat TPEB, and nanocrystalline diamond carbon material (referred to as "ZrC-nanodiamond"). The fifth sample was composed of a blend of ZrH$_2$, neat TPEB, and zirconium nitride ceramic (referred to as "ZrC—ZrN"). The sixth sample was composed of a blend of ZrH$_2$, neat TPEB, and zirconium boride ceramic (referred to as "ZrC—ZrB$_2$"). The seventh sample was composed of a blend of ZrH$_2$, neat TPEB, and porous activated carbon (referred to as "ZrC—YP50"). All discs were heated in a tube furnace under flowing argon up to 1400° C.

Figure 17:
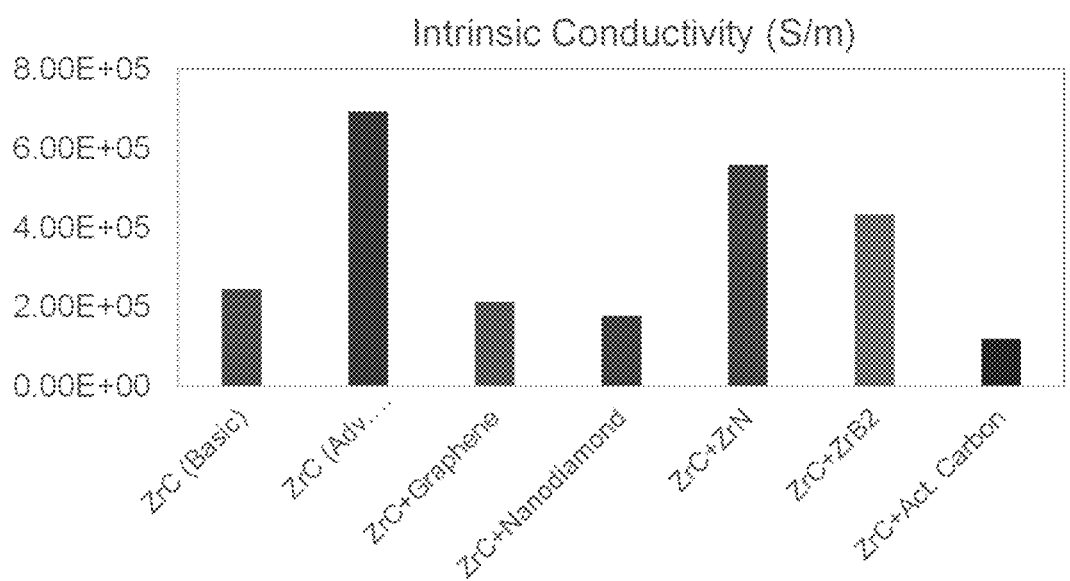
FIG. 17 shows a sheet conductivity comparison of ZrC with different embedded inclusions and synthesis preparation methods as measured with a four-point probe instrument.

Four-point probe conductivity measurements analyzed the sheet resistance of each disk. Measurements were conducted at room temperature. FIG. 17 shows the conductivity measurement results.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
   nanoparticles of a metal nitride, boride, silicide, or carbide;
   a filler material selected from aluminum oxide, a carbon nanostructure, graphene nanoplatelets, boron nitride nanotubes, macroscale beads, macroscale spheres, and SiCN beads; and
   a carbonaceous matrix.

2. The composition of claim 1, wherein the composition is not in the form of a powder.

3. The composition of claim 1, wherein the nanoparticles comprise boron carbide, silicon carbide, iron carbide, iron boride, vanadium carbide, or tantalum carbide.

4. The composition of claim 1, wherein the composition comprises at least 5% by weight of the nanoparticles.

5. The composition of claim 1, wherein the filler material selected from aluminum oxide, graphene nanoplatelets, boron nitride nanotubes, macroscale beads, macroscale spheres, and SiCN beads.

* * * * *